United States Patent
Mahurin et al.

(10) Patent No.: US 10,459,731 B2
(45) Date of Patent: Oct. 29, 2019

(54) SLIDING WINDOW OPERATION

(71) Applicant: QUALCOMM Incorporated, San Diego, CA (US)

(72) Inventors: Eric Mahurin, Austin, TX (US); Jakub Pawel Golab, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 14/803,728

(22) Filed: Jul. 20, 2015

(65) Prior Publication Data

US 2017/0024218 A1   Jan. 26, 2017

(51) Int. Cl.
  *G06F 9/302* (2018.01)
  *G06F 9/315* (2018.01)
  *G06F 15/80* (2006.01)
  *G06F 9/38* (2018.01)
  (Continued)

(52) U.S. Cl.
  CPC ........ *G06F 9/3887* (2013.01); *G06F 9/30134* (2013.01); *G06F 15/82* (2013.01); *G06F 9/3001* (2013.01); *G06F 9/30021* (2013.01); *G06F 9/30029* (2013.01); *G06F 9/30032* (2013.01); *G06F 9/30036* (2013.01); *G06F 9/30105* (2013.01); *G06F 9/30112* (2013.01); *G06F 15/8007* (2013.01)

(58) Field of Classification Search
  CPC .. G06F 9/3887; G06F 9/3001; G06F 9/30032; G06F 9/30036; G06F 9/30134; G06F 15/82; G06F 9/30021; G06F 9/30029; G06F 9/30105; G06F 9/30112; G06F 15/8007

USPC .............................. 712/2–9, 22, 25, 221–225
See application file for complete search history.

(56) References Cited

U.S. PATENT DOCUMENTS 4,456,955 A * 6/1984 Yanagita ................... G06F 7/48
                                                           708/670
6,009,505 A * 12/1999 Thayer ................ G06F 9/30014
                                                           708/514

(Continued)

FOREIGN PATENT DOCUMENTS

WO   2006106342 A2   10/2006
WO   2008077803 A1    7/2008

OTHER PUBLICATIONS

International Search Report and Written Opinion—PCT/US2016/041779—ISA/EPO—dated Oct. 31, 2016.

*Primary Examiner* — Daniel H Pan
(74) *Attorney, Agent, or Firm* — Qualcomm Incorporated-Toler

(57) ABSTRACT

A first register has a lane storing first input data and a second register has a lane storing second input data elements. A width of the lane of the second register is equal to a width of the lane of the first register. A single-instruction-multiple-data (SIMD) lane has a lane width equal to the width of the lane of the first register. The SIMD lane is configured to perform a sliding window operation on the first input data elements in the lane of the first register and the second input data elements in the lane of the second register. Performing the sliding window operation includes determining a result based on a first input data element stored in a first position of the first register and a second input data element stored in a second position of the second register. The second position is different from the first position.

30 Claims, 5 Drawing Sheets

(51) Int. Cl.
*G06F 9/30* (2018.01)
*G06F 15/82* (2006.01)

(56) References Cited

U.S. PATENT DOCUMENTS

| | | | |
|---|---|---|---|
| 6,230,253 B1* | 5/2001 | Roussel | G06F 9/30014 |
| | | | 712/208 |
| 7,126,991 B1 | 10/2006 | Mimar | |
| 2002/0035678 A1* | 3/2002 | Rice | G06F 9/30025 |
| | | | 712/223 |
| 2005/0198473 A1 | 9/2005 | Ford | |
| 2008/0100628 A1 | 5/2008 | Mejdrich et al. | |
| 2014/0281371 A1 | 9/2014 | Thantry et al. | |

* cited by examiner

SLIDING WINDOW OPERATION

I. FIELD

The present disclosure is generally related to sliding window operations for a single-instruction-multiple-data (SIMD) architecture. More specifically, the present disclosure is related to reducing an amount of shifts and registers associated with performing the sliding window operations.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Advances in technology have also resulted in wireless computing devices that include processors that perform signal processing (e.g., image processing, video processing, audio processing, etc.). The processors apply a convolution function to input signals to perform signal processing. A conventional convolution function may use a "sliding window" to process an input data stream. A sliding window of a portion of data elements from the input data stream may be used to generate a first output that is a function (e.g., a sum of products) of each data element in the sliding window. To determine a next output, the sliding window is shifted and the next output is determined as a function of each data element in the shifted sliding window.

A relatively large number of registers and shifts may be used to perform convolution functions using a conventional sliding window instruction. As a non-limiting example, a single-instruction-multiple-data (SIMD) architecture may execute a conventional sliding window instruction using a four data input "lane." To illustrate, the lane may perform a convolution function on four data inputs (e.g., a sliding window width of "4") from a register to produce an output. To produce an additional output, the data elements may be shifted by one location in a second register and the lane may perform a convolution function on the data elements in the second register. Thus, for each output of the convolution function, multiple registers and shifts may be used.

III. SUMMARY

Systems and methods for reducing shifts and registers for performing sliding window operations are disclosed. For example, techniques for performing sliding window operations within a single SIMD lane by referencing multiple registers that include data for operations are disclosed. To illustrate, a sliding window operation may reference a first register and a second register. For example, a SIMD lane may reference the first register and the second register to perform sliding window operations on data in the first and second registers. As an example, a portion of the first register in the SIMD lane may store four data elements (e.g., data element "0", data element "1", data element "2", and data element "3") of an input data stream, and a portion of the second register in the SIMD lane may store the next four data elements (e.g., data element "4", data element "5", data element "6", and data element "7") of the input data stream. With respect to the portion of the first register, the corresponding portion of the second register may include shifted data of the input data stream.

The SIMD lane may reference the two registers to perform up to five sliding window operations. For example, a SIMD architecture may multiplex data in the registers to perform the sliding window operations. To illustrate, the first SIMD lane may perform a first sliding operation using the first four data elements in the first register (e.g., data element "0", data element "1", data element "2", and data element "3"), a second sliding window operation using data elements "1, 2, and 3" of the first register and data element "4" of the second register, a third sliding window operation using data elements "2 and 3" of the first register and data elements "4 and 5" of the second register, a fourth sliding window operation using data element "3" of the first register and data elements "4, 5, and 6" of the second register, etc.

In a particular aspect, an apparatus includes a first register having a lane storing first input data and a second register having a lane storing second input data elements. A width of the lane of the second register is equal to a width of the lane of the first register. The apparatus further includes a single-instruction-multiple-data (SIMD) lane having a lane width equal to the width of the lane of the first register. The SIMD lane is configured to perform a sliding window operation on the first input data elements in the lane of the first register and the second input data elements in the lane of the second register. Performing the sliding window operation includes determining a result based on a first input data element stored in a first position of the first register and a second input data element stored in a second position of the second register. The second position is different from the first position.

In another particular aspect, a method includes storing first input data elements in a lane of a first register and storing second input data elements in a lane of a second register, where a width of the lane of the second register is equal to a width of the lane of the first register. The method further includes performing a sliding window operation on the first input data elements in the lane of the first register and the second input data elements in the lane of the second register using a single-instruction-multiple-data (SIMD) lane having a lane width equal to the width of the lane of the first register. Performing the sliding window operation includes determining a result based on a first input data element stored in a first position of the first register and a second input data element stored in a second position of the second register. The second position is different from the first position.

In another particular aspect, an apparatus includes first means for storing data and second means for storing data. The first means for storing data has a lane storing first input data elements, and the second means for storing data has a lane storing second input data elements. A width of the lane of the second means for storing data is equal to a width of the lane of the first means for storing data. The apparatus further includes means for performing a sliding window operation on the first input data elements in the lane of the first means for storing data and the second input data elements in the lane of the second means for storing data. The means for performing the sliding window operation has a lane width equal to the width of the lane of the first means for storing data. Performing the sliding window operation includes determining a result based on a first input data element stored in a first position of the first means for storing data and a second input data element stored in a second position of the second means for storing data. The second position is different from the first position.

In another particular aspect, a non-transitory computer-readable medium includes instructions that, when executed by a processor, cause the processor to store first input data elements in a lane of a first register and store second input data elements in a lane of a second register, where a width of the lane of the second register is equal to a width of the lane of the first register. The instructions are further executable to cause the processor to perform a sliding window operation on the first input data elements in the lane of the first register and the second input data elements in the lane of the second register using a single-instruction-multiple-data (SIMD) lane having a lane width equal to the width of the lane of the first register. Performing the sliding window operation includes determining a result based on a first input data element stored in a first position of the first register and a second input data element stored in a second position of the second register. The second position is different from the first position.

One particular advantage provided by at least one of the disclosed implementations is that a SIMD lane may perform sliding window operations using fewer registers and shifts than a conventional SIMD architecture. Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
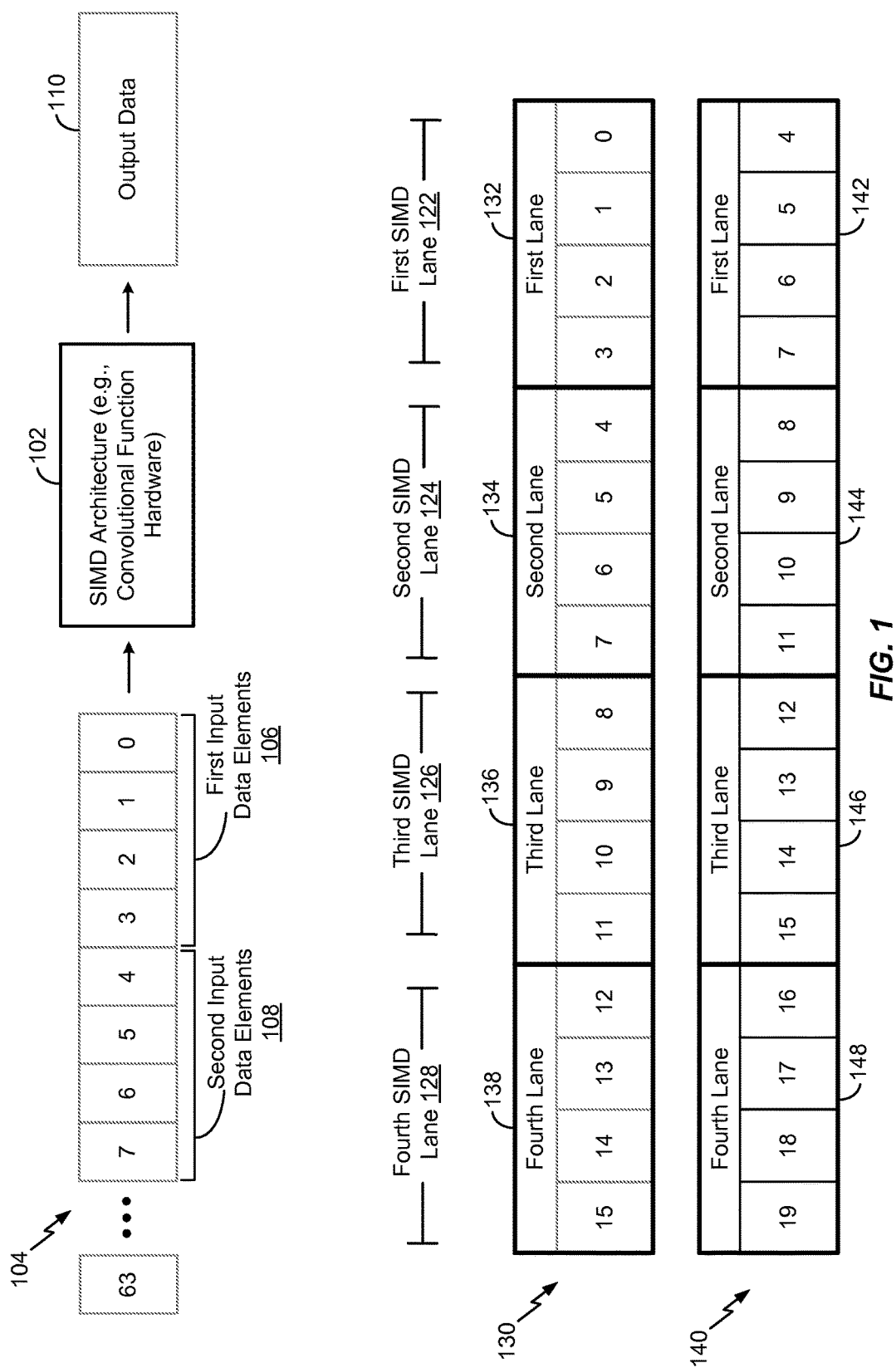
FIG. 1 illustrates operations of a system to perform sliding window operations.

Referring to FIG. 1, operations of a system to perform sliding window operations is shown. The system may perform the sliding window operations within a single-instruction-multiple-data (SIMD) lane by referencing multiple registers that include data for the operations. The system may include a SIMD architecture 102 (e.g., convolutional function hardware and/or sliding window hardware).

Input data 104 may be provided to the SIMD architecture 102. As described below, particular portions of the input data 104 may be shifted and stored in certain register positions to enable sliding window operations to be performed according to the techniques described herein. The input data 104 may include sixty-four data elements (e.g., data element "0" to data element "63"). In alternative implementations, the input data 104 may include additional (or fewer data elements). In the illustrative implementation, the input data 104 may include first input data elements 106 and second input data elements 108. The first input data elements 106 may include data element "0", data element "1", data element "2", and data element "3". The second input data elements 108 may include data element "4", data element "5", data element "6", and data element "7". Although not explicitly shown with respect to the input data 104, the input data 104 may also include third input data elements (e.g., data element "8" through data element "11"), fourth input data elements (e.g., data element "12" through data element "15"), fifth input data elements (e.g., data element "16" through data element "19"), etc.

The SIMD architecture 102 may be configured to apply a convolution function to the input data 104 to generate output data 110. For example, the SIMD architecture 102 may apply a "sliding window" function to data elements in the input data 104 to generate the output data 110. Each output data element of the output data 110 may be a function (e.g., a sum of products) of the input data elements in the sliding window. To illustrate, a first output data element of the output data 110 may be a sum of products of the first input data elements 106. For example, the first output data element of the output data 110 may be a function of data element "0", data element "1", data element "2", and data element "3". The second output data element of the output data 110 may be a function of data element "1", data element "2", data element "3", and data element "4". Techniques for performing the sliding window operations are explained in greater detail below.

The SIMD architecture 102 may include a first SIMD lane 122, a second SIMD lane 124, a third SIMD lane 126, and a fourth SIMD lane 128. Although four SIMD lanes are depicted in FIG. 1, in alternative implementations, additional (or fewer) SIMD lanes may be included in the SIMD architecture 102. As described below, each SIMD lane 122-128 may be configured to perform sliding window operations on input data elements within the corresponding SIMD lane 122-128.

The system may also include a first register 130 and a second register 140. Each register 130, 140 may store input data elements of the input data 104. The first register 130 may include a first lane 132, a second lane 134, a third lane 136, and a fourth lane 138. In the illustrated implementation, each lane 132-138 of the first register 130 may have a width of four. For example, each lane 132-138 of the first register 130 may be allocated to store four data elements. For example, each lane 132-138 of the first register 130 may be operable to store four input data elements of the input data 104. The first lane 132 of the first register 130 may store the first input data elements 106 (e.g., data element "0" through data element "3") of the input data 104, the second lane 134 of the first register 130 may store the second input data elements 108 (e.g., data element "4" through data element "7") of the input data 104, the third lane 136 of the first register 130 may store the third input data elements (e.g., data element "8" through data element "11") of the input data 104, and the fourth lane 138 of the first register 130 may store the fourth input data elements (e.g. data element "12" through data element "15") of the input data 104.

Additionally, the width of each lane 132-138 of the first register 130 may be equal to a lane width of a corresponding SIMD lane 122-128. For example, the lane width of the first SIMD lane 122 is equal to the width of the first lane 132 of the first register 130, the lane width of the second SIMD lane 124 is equal to the width of the second lane 134 of the first register 130, the lane width of the third SIMD lane 126 is equal to the width of the third lane 136 of the first register 130, and the lane width of the fourth SIMD lane 128 is equal to the width of the fourth lane 138 of the first register 130.

The second register 140 may include a first lane 142, a second lane 144, a third lane 146, and a fourth lane 148. In the illustrated implementation, each lane 142-148 of the second register 140 may also have a width of four. For example, each lane 142-148 of the second register 140 may be operable to store four input data elements of the input data 104. With respect to the input data elements stored in lanes 132-138 of the first register 130, the input data elements stored in the corresponding lanes 142-148 of the second register 140 may be shifted by the lane width (e.g., shifted by four). For example, the first lane 142 of the second register 140 may store the second input data elements 108 (e.g., data element "4" through data element "7") of the input data 104, the second lane 144 of the second register 140 may store the third input data elements (e.g., data element "8" through data element "11") of the input data 104, the third lane 146 of the second register 140 may store the fourth input data elements (e.g., data element "12" through data element "15") of the input data 104, and the fourth lane 148 of the second register 140 may store the fifth input data elements (e.g. data element "16" through data element "19") of the input data 104.

Each data element may be stored in a particular position of a corresponding register. As used herein, a "position" of a register corresponds to a relative address (or location) in the register with respect to the starting address. For example, a data element stored in a first position may be stored at a location at the beginning of the register, and a data element stored in a last position may be stored at a location at the end of the register. To illustrate, with respect to the registers 130, 140, data element "0" may be stored at a first position of the first register 130 and data element "4" may be stored at a first position of the second register 140. Data element "1" and data element "5" may be stored at a second position of the first register 130 and a second position of the second register 140, respectively. Data element "2" and data element "6" may be stored at a third position of the first register 130 and a third position of the second register 140, respectively. Data element "3" and data element "7" may be stored at a fourth position of the first register 130 and a fourth position of the second register 140, respectively.

The first SIMD lane 122 may reference the first register 130 and the second register 140 to perform sliding window operations on data that is equivalent to the lane size. As described in greater detail with respect to FIG. 2, circuitry within the first SIMD lane 122 may multiplex data in the registers 130, 140 to perform the sliding window operations. The first SIMD lane 122 may reference the first lanes 132, 142 of the first and second registers 130, 140, respectively, to perform up to five sliding window operations. To illustrate, the first SIMD lane 122 may perform a first sliding window operation using the first four data elements in the first register 130 (e.g., data element "0", data element "1", data element "2", and data element "3"). After performing the first sliding window operation, the first SIMD lane 122 may perform a second sliding window operation using data element "1" through data element "3" in the first lane 132 of the first register 130 and using data element "4" in the first lane 142 of the second register 140.

The first SIMD lane 122 may also be configured to perform a third sliding window operation using data element "2" and data element "3" of the first lane 132 of the first register 130 and using data element "4" and data element "5" of the first lane 142 of the second register 140. After performing the third sliding window operation, the first SIMD lane 122 may perform a fourth sliding window operation using data element "3" of the first lane 132 of the first register 130 and using data element "4" through data element "6" of the first lane 142 of the second register 140. The first SIMD lane 122 may further be configured to perform a fifth sliding window operation using the first four data elements in the second register 140 (e.g., data element "4" through data element "7").

Thus, the first SIMD lane 122 may perform five sliding window operations using two registers 130, 140. Data elements in the first lane 132 of the first register 130 and data elements in the first lane 142 of the second register 142 may be "offset" by a single shift (e.g., a four element shift) in the input data 104. As a result, the first SIMD lane 122 may have "access" to eight data elements using two registers 130, 140. Thus, two registers 130, 140 may be used to perform five sliding window operations compared to a conventional SIMD architecture that may require a single SIMD lane to use four registers and four shifts (e.g., four single-elements shifts). As shown in FIG. 1, because the data in the second register 140 is shifted by four instead of one, all of the data elements necessary to calculate up to five outputs are accessible to the first SIMD lane 122 using two registers 130, 140. Thus, a reduced number of registers and shifts may be utilized compared to other sliding window operations and SIMD architectures.

It will also be appreciated that the second SIMD lane 124, the third SIMD lane 126, and the fourth SIMD lane 128 may each perform up to five sliding window operations using the two registers 130, 140. The SIMD lanes 124-128 may operate in a substantially similar manner with respect to the corresponding lanes 134-138, 144-148 of the registers 130, 140, respectively, as the first SIMD lane 122 operates with respect to the first lanes 132, 142 of the registers 130, 140. For example, the second SIMD lane 124 may perform up to five sliding window operations using the second input data elements 108 in the second lane 134 of the first register 130 and using the third input data elements in the second lane 144 of the second register 140. The third SIMD lane 126 may perform up to five sliding window operations using the third input data elements in the third lane 136 of the first register 130 and using the fourth input data elements in the third lane 146 of the second register 140. Additionally, the fourth SIMD lane 128 may perform up to five sliding window operations using the fourth input data elements in the fourth lane 138 of the first register 130 and using the fifth input data elements in the fourth lane 148 of the second register 140. Additional SIMD lanes (not shown) may operate in a substantially similar manner as the illustrated SIMD lanes 122-128 to perform sliding window operations on the remaining input data 104.

Figure 2:
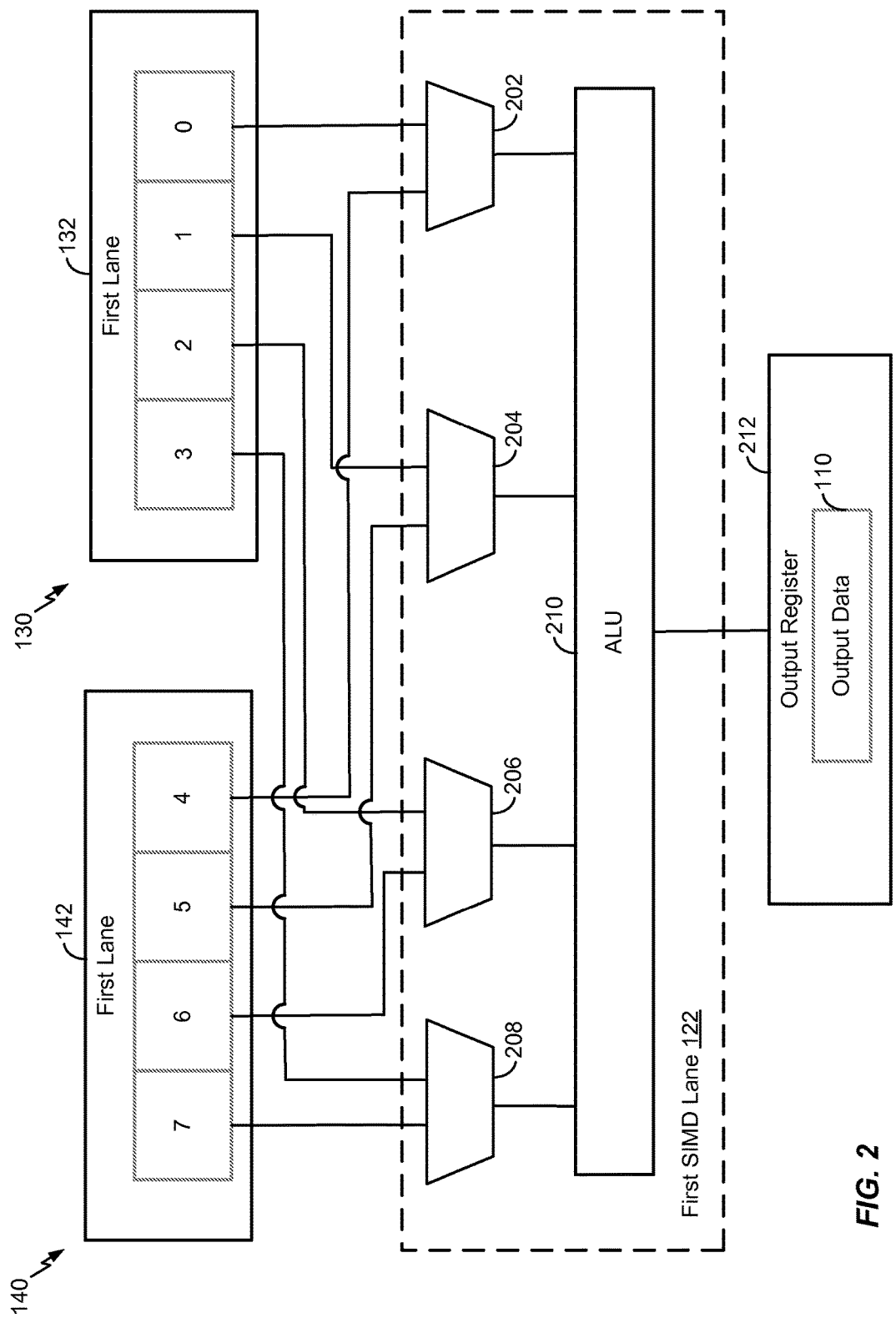
FIG. 2 illustrates circuitry within a single-instruction-multiple-data (SIMD) lane.

Referring to FIG. 2, circuitry within the first SIMD lane 122 is shown. The first SIMD lane 122 includes a first multiplexer 202, a second multiplexer 204, a third multiplexer 206, a fourth multiplexer 208, and an arithmetic and logic unit (ALU) 210. In a particular implementation, the ALU 210 may include sum of products circuitry. The circuitry within the first SIMD lane 122 is for illustrative purposes and is not intended to be limiting. For example, additional (or fewer) circuit components may be included in the first SIMD lane 122. Although circuitry within the first SIMD lane 122 is depicted in FIG. 2, the other SIMD lanes 124-128 of the system of FIG. 1 may include similar circuit components.

A first input of the first multiplexer 202 may be coupled to data element "0" stored in the first lane 132 of the first register 130, and a second input of the first multiplexer 202 may be coupled to data element "4" stored in the first lane 142 of the second register 140. Based on a selection signal (not shown) provided to the first multiplexer 202, the first multiplexer 202 may provide data element "0" or data element "4" to the ALU 210. In a particular aspect, an immediate field in an operational code of an instruction may determine whether the multiplexer 202 provides data element "0" (e.g., a data element in a first window in the first lane 142) or data element "4" (e.g., a data element in a first window in the first lane 142) to the ALU 210.

A first input of the second multiplexer 204 may be coupled to data element "1" stored in the first lane 132 of the first register 130, and a second input of the second multiplexer 204 may be coupled to data element "5" stored in the first lane 142 of the second register 140. Based on a selection signal (not shown) provided to the second multiplexer 204, the second multiplexer 204 may provide data element "1" or data element "5" to the ALU 210. In a particular aspect, the immediate field in the operational code of the instruction may determine whether the multiplexer 204 provides data element "1" (e.g., a data element in a second window in the first lane 142) or data element "5" (e.g., a data element in a second window in the first lane 142) to the ALU 210.

A first input of the third multiplexer 206 may be coupled to data element "2" stored in the first lane 132 of the first register 130, and a second input of the third multiplexer 206 may be coupled to data element "6" stored in the first lane 142 of the second register 140. Based on a selection signal (not shown) provided to the third multiplexer 206, the third multiplexer 206 may provide data element "2" or data element "6" to the ALU 210. In a particular aspect, the immediate field in the operational code of the instruction may determine whether the multiplexer 206 provides data element "2" (e.g., a data element in a third window in the first lane 142) or data element "6" (e.g., a data element in a third window in the first lane 142) to the ALU 210.

Additionally, a first input of the fourth multiplexer 208 may be coupled to data element "3" stored in the first lane 132 of the first register 130, and a second input of the fourth multiplexer 208 may be coupled to data element "7" stored in the first lane 142 of the second register 140. Based on a selection signal (not shown) provided to the fourth multiplexer 208, the fourth multiplexer 208 may provide data element "3" or data element "7" to the ALU 210. In a particular aspect, the immediate field in the operational code of the instruction may determine whether the multiplexer 208 provides data element "3" (e.g., a data element in a fourth window in the first lane 142) or data element "7" (e.g., a data element in a fourth window in the first lane 142) to the ALU 210. Thus, the first SIMD lane 122 may simultaneously perform sliding window operations on a plurality of windows in the first lane 132 of the first register 130, a plurality of windows in the first lane 142 of the second register 140, or any combination thereof, based on the instruction.

During operation, the first SIMD lane 122 may perform up to five sliding window operations based on data in the first lanes 132, 142 of the registers 130, 140. The following example corresponds to the third sliding window operation (e.g., a sum of products operations using data element "2", data element "3", data element "4", and data element "5"); however, similar techniques may be applied to perform the first sliding widow operation, the second sliding window operation, the fourth sliding window operation, and the fifth sliding window operation.

To perform the third sliding window operation, the first multiplexer 202 may provide data element "4" to the ALU 210 based on the selection signal provided to the first multiplexer 202, and the second multiplexer 204 may provide data element "5" to the ALU 210 based on the selection signal provided to the second multiplexer 204. Additionally, the third multiplexer 206 may provide data element "2" to the ALU 210 based on the selection signal provided to the third multiplexer 206, and the fourth multiplexer 208 may provide data element "3" to the ALU 210 based on the selection signal provided to the fourth multiplexer 208.

The ALU 210 may be configured to generate output data 110 based on the sum of products of data element "2", data element "3", data element "4", and data element "5". For example, the ALU 210 may perform a vertical operation (e.g., a multiplication operation) on the data elements provided by the multiplexers 202-208. As a non-limiting example of the multiplication operation, the ALU 210 may multiply data element "2" with data element "3" to generate a first product, multiply data element "3" with data element "4" to generate a second product, multiply data element "4" with data element "5" to generate a third product, and multiply data element "5" with data element "2" to generate a fourth product. After the vertical operation, the ALU 210 may perform a horizontal operation on the products resulting from the vertical operation. Non-limiting examples of a horizontal operation may include a summation operation, a bitwise OR operation, or a multiplication operation. As a non-limiting example of the summation operation, the ALU 210 may sum the first product, the second product, the third product, and the fourth product. Thus, the horizontal operation may be performed after the vertical operation. In the above example, the horizontal operation and the vertical operation correspond to a sum-of-products.

Although FIG. 2 depicts the ALU 210 as sum of products circuitry, in alternative implementations, ALUs may be implemented with the first SIMD lane 122 to perform sliding window operations. As non-limiting examples, an ALU that performs a product of sums operation, a logical AND operation, a logical OR operation, a logical NAND operation, or a logical NOR operation, may be implemented with the first SIMD lane 122.

Thus, the circuitry within the first SIMD lane 122 may perform up to five sliding window operations using two registers 130, 140 and a single shift (e.g., a four element shift between the registers 130, 140) compared to a SIMD architecture that may require a single SIMD lane to use four registers and four shifts (e.g., four single-elements shifts). As shown in FIG. 2, because the data in the second register 140 is shifted by four instead of one, all of the data elements necessary to calculate up to five outputs are accessible to the first SIMD lane 122 using two registers 130, 140. Thus, a reduced number of registers and shifts may be utilized compared to other sliding window operations and SIMD architectures.

Figure 3:
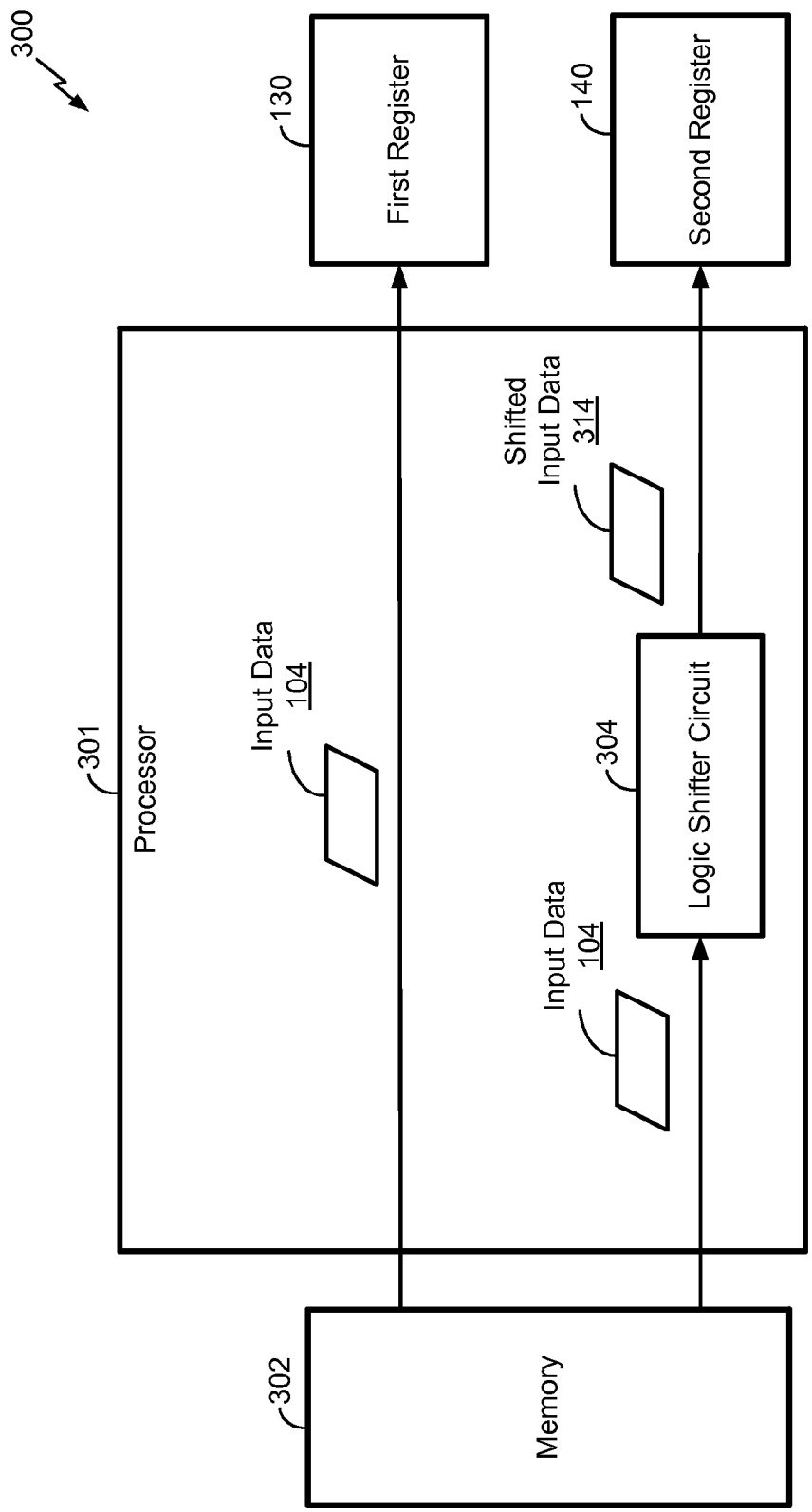
FIG. 3 is a diagram of a system that is operable to load input data into a first register and to load a shifted version of the input data into a second register.

Referring to FIG. 3, a system 300 that is operable to load the input data 104 into the first register 130 and to load a shifted version of the input data 104 into the second register 140 is shown. The system 300 includes a processor 301, a memory 302, the first register 130, and the second register 140. The processor 301 includes a logic shifter circuit 304.

Upon receiving a load instruction, the processor 301 may retrieve the input data 104 from a memory location in the memory 302 and may load the input data 104 into the first register 130. The processor 301 may load the input data 104 into the first register 130 according to an alignment depicted in FIG. 1. For example, data element "0" through data element "3" may be loaded into the first lane 132 of the first register 130, data element "4" through data element "7" may be loaded into the second lane 134 of the first register 130, etc.

The processor 301 may also retrieve the input data 104 from the memory location in the memory 302 and provide the input data 104 to the logic shifter circuit 304 upon receiving the load instruction. The logic shifter circuit 304 may be configured to shift the input data 104 by the lane width of the SIMD lanes 122-128. For example, the logic shifter circuit 304 may shift the input data 104 by four to generate shifted input data 314. The processor 301 may load the shifted input data 314 into the second register 140 according to the alignment depicted in FIG. 1. For example, data element "4" through data element "7" may be loaded into the first lane 142 of the second register 140, data element "8" through data element "11" may be loaded into the second lane 144 of the second register 140, etc.

Although the logic shifter circuit 304 is depicted to be included in the processor 301, in other implementations, the logic shifter circuit 304 may be external to the processor 301. In a particular implementation, the processor 301 may be a central processing unit (CPU) of a device (e.g., a mobile phone). In alternate implementations, the processor 301 may be external to the CPU (e.g., the processor 301 may be an application-specific integrated circuit).

The system 300 of FIG. 3 may provide a shift during a load operation to align the data elements in the registers 130, 140 as depicted in FIG. 1. For example, the logic shifter circuit 304 may shift the input data 104 such that the first lane 142 of the second register 140 stores data element "4" through data element "7" (as opposed to data element "0" through data element "3"). The shift may enable the first SIMD lane 122 to perform up to five sliding window operations using the two registers 130, 140, as described with respect to FIGS. 1-2.

Figure 4:
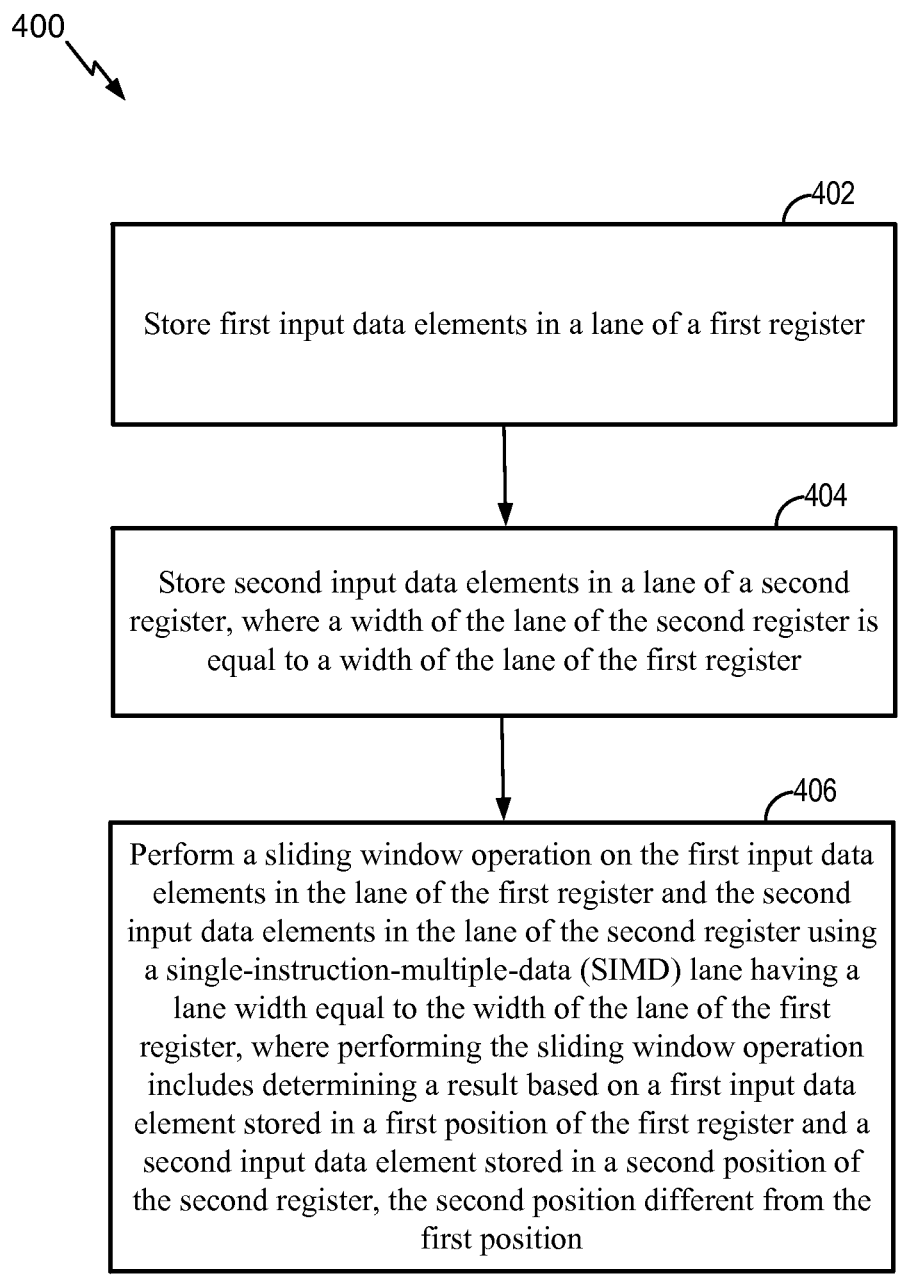
FIG. 4 is a flow chart of a method for performing sliding window operations.

Referring to FIG. 4, a flowchart of a method 400 for performing a sliding window operation is shown. The method 400 may be performed by the SIMD architecture 102 of FIG. 1 (e.g., the SIMD lanes 122-128) and/or the processor 301 of FIG. 3 using the first register 130 of FIGS. 1-3, the second register 140 of FIGS. 1-3, the output register 212 of FIG. 2, the memory 302 of FIG. 3, or any combination thereof.

The method 400 includes storing first input data elements in a lane of a first register, at 402. For example, referring to FIGS. 1-3, the processor 301 may store the first input data elements 106 (e.g., data element "0" through data element "3") of the input data 104 into the first lane 132 of the first register 130. To illustrate, the processor 301 may load the first input data elements 106 into the first lane 132 of the first register 130 in response to receiving the load instruction. Additionally, the processor 301 may store the second input data elements 108 (e.g., data element "4" through data element "7") of the input data 104 into the second lane 124 of the first register 130. To illustrate, the processor 301 may load the second input data elements 108 into the second lane 134 of the first register 130 in response to receiving the load instruction.

Second input data elements may be stored in a lane of a second register, at 404. For example, referring to FIGS. 1-3, the processor 301 may store the second input data elements 108 of the input data into the first lane 142 of the second register 140. To illustrate, the processor 301 may retrieve the input data 104 from the memory location in the memory 302 and provide the input data 104 to the logic shifter circuit 304 upon receiving the load instruction. The logic shifter circuit 304 may shift the input data 104 by the lane width of the SIMD lanes 122-128. For example, the logic shifter circuit 304 may shift the input data 104 by four to generate shifted input data 314. The processor may load the shifted input data 314 into the second register 140 according to the alignment depicted in FIG. 1. For example, data element "4" through data element "7" may be loaded into the first lane 142 of the second register 140. The width of the first lane 142 of the second register 140 may be equal to the width of the first lane 132 of the first register 130.

A sliding window operation may be performed on the first input data elements in the lane of the first register and the second input data elements in the lane of the second register using a SIMD lane having a lane width equal to the width of the lane of the first register, at 406. As used herein, a "sliding window operation" may include any operation in which multiple neighboring data elements (e.g., the first input data elements and the second input data elements) in a data stream are taken as data inputs and an output is produced. Although a sum of products is described above as a sliding window operation, it should be understood that a sum of products is merely one example. Other examples of sliding window operations may include a product of sums, summation operations, multiplication operations, etc. Performing the sliding window operation may include determining a result based on a first input data element stored in a first position of the first register and a second input data element stored in a second position of the second register that is different from the first position. As a non-limiting example, referring to FIGS. 1-2, the result of one sliding window operation may be based on data elements "1-4". Data element "1" may be in one position of the first register 130 (e.g., the second position) and data element "4" may be in another position of the second register 140 (e.g., the first position) that is different from the position of data element "1". As described above, the first SIMD lane 122 may perform up to five sliding window operations (e.g., five sliding window operations) using the first input data elements 106 stored in the first lane 132 of the first register 130 and using the second input data elements 108 stored in the first lane 142 of the second register 140. Thus, the number of sliding window operations (e.g., five) performed by the first SIMD lane 122 may be greater than or equal to the width (e.g., four) of the first SIMD lane 122.

The method 400 of FIG. 4 may enable the first SIMD lane 122 to perform up to five sliding window operations using two registers 130, 140 and a single shift (e.g., a four data element shift between the registers 130, 140 by the logic shifter circuit 304 as depicted in FIG. 3) compared to another SIMD architecture that may require a single SIMD lane to use four registers and four shifts (e.g., four single-elements shifts). Because the data in the second register 140 is shifted by four instead of one, all of the data elements necessary to calculate up to five outputs are accessible to the first SIMD lane 122 using two registers 130, 140. Thus, a reduced number of registers and shifts may be utilized compared to other sliding window operations and SIMD architectures.

In a particular implementation, the method 400 may include performing similar operations at additional SIMD lanes. For example, the SIMD lanes 124-128 may operate in a substantially similar manner with respect to the corresponding lanes 134-138, 144-148 of the registers 130, 140, respectively, as the first SIMD lane 122 operates with respect to the first lanes 132, 142 of the registers 130, 140. For example, the second SIMD lane 124 may perform up to five sliding window operations using the second input data elements 108 in the second lane 134 of the first register 130 and using the third input data elements in the second lane 144 of the second register 140. The third SIMD lane 126 may perform up to five sliding window operations using the third input data elements in the third lane 136 of the first register 130 and using the fourth input data elements in the third lane 146 of the second register 140. Additionally, the fourth SIMD lane 128 may perform up to five sliding window operations using the fourth input data elements in the fourth lane 138 of the first register 130 and using the fifth input data elements in the fourth lane 148 of the second register 140. Additional SIMD lanes (not shown) may operate in a substantially similar manner as the illustrated SIMD lanes 122-128 to perform sliding window operations on the remaining input data 104.

Figure 5:
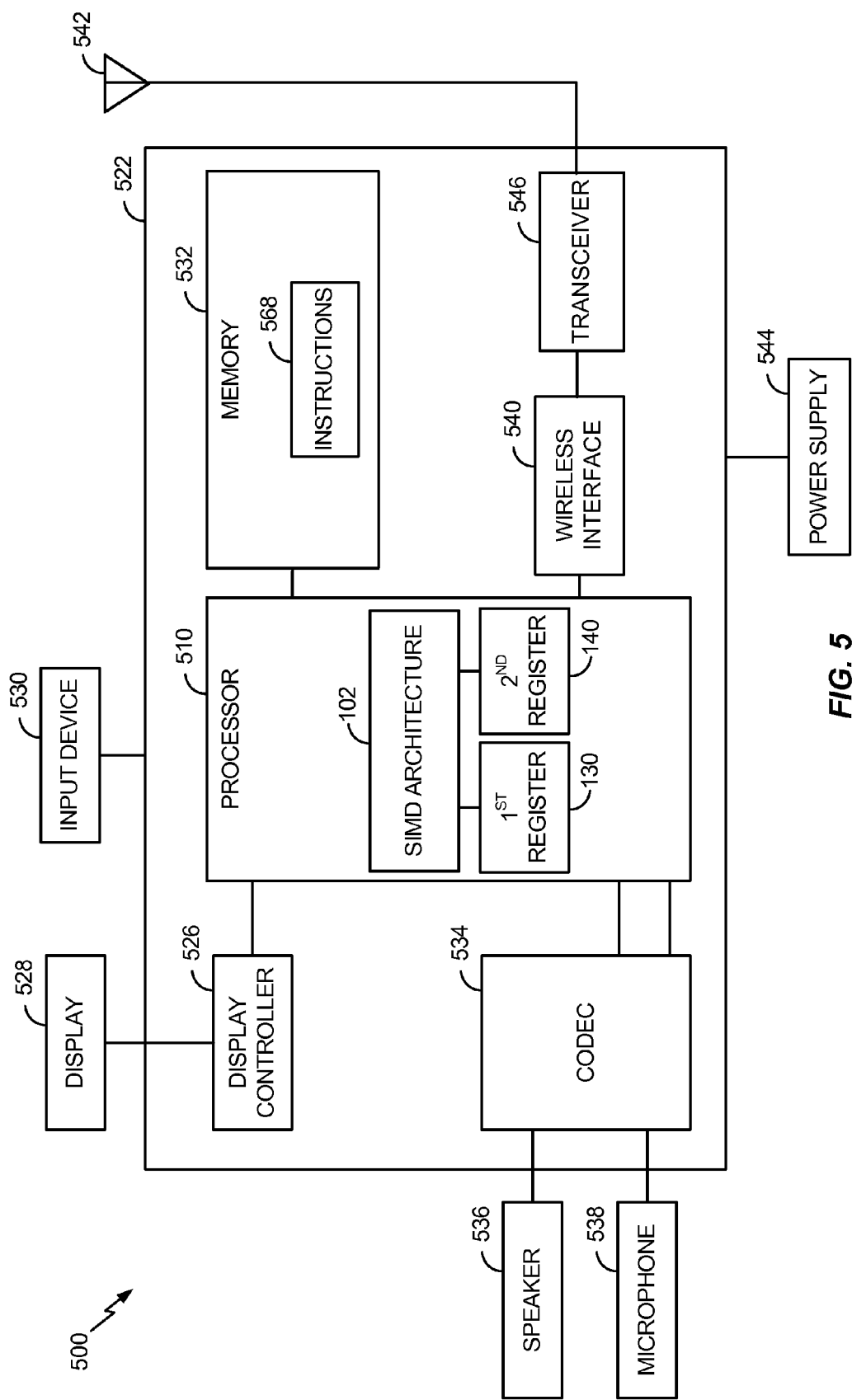
FIG. 5 is a block diagram of a device that includes components that are operable to perform sliding window operations.

Referring to FIG. 5, a wireless communication device is depicted and generally designated 500. The device 500 includes a processor 510, such as a digital signal processor, coupled to a memory 532.

The processor 510 may be configured to execute software (e.g., a program of one or more instructions 568) stored in the memory 532. The processor 510 may include the SIMD architecture 102 of FIG. 1, the first register 130 of FIG. 1, and the second register 140 of FIG. 1. For example, the SIMD architecture 102 may be within an execution unit of the processor 510 and may reference the registers 130, 140 to perform convolution functions, as described above. In a particular implementation, the processor 510 may be operable to perform the method 400 of FIG. 4. For example, the processor 510 (e.g., the SIMD architecture 102) may store the first input data elements 106 in the first lane 132 of the first register 130 and may store the second input data elements 108 in the first lane 142 of the second register 140. The SIMD architecture 102 may perform up to five sliding window operations using the data elements stored in the first lanes 132, 142 of the registers 130, 140, respectively, as described above.

In a particular implementation, the processor 510 may be configured to execute one or more instructions 568 stored in the memory 532 to perform the method 400 of FIG. 4. For example, the memory 532 may be a non-transitory computer-readable medium that includes instructions 568 that, when executed by the processor 510, cause the processor 510 to perform the method 400 of FIG. 4.

A wireless interface 540 may be coupled to the processor 510 and coupled, via a transceiver 546, to an antenna 542. A coder/decoder (CODEC) 534 can also be coupled to the processor 510. A speaker 536 and a microphone 538 can be coupled to the CODEC 534. A display controller 526 can be coupled to the processor 510 and to a display device 528. In a particular implementation, the processor 510, the display controller 526, the memory 532, the CODEC 534, and the wireless interface 540 are included in a system-in-package or system-on-chip device 522. In a particular implementation, an input device 530 and a power supply 544 are coupled to the system-on-chip device 522. Moreover, in a particular implementation, as illustrated in FIG. 5, the display device 528, the input device 530, the speaker 536, the microphone 538, the antenna 542, and the power supply 544 are external to the system-on-chip device 522. However, each of the display device 528, the input device 530, the speaker 536, the microphone 538, the antenna 542, and the power supply 544 can be coupled to one or more components of the system-on-chip device 522, such as one or more interfaces or controllers.

The convolution functions with respect to FIGS. 1-4 may be used to perform image processing at the device 500. For example, the convolution functions may be applied to a kernel (e.g., a convolution matrix or a mask) to blur pixels of an image, to sharpen pixels of an image, to detect edges within an image, etc. Thus, the device 500 may perform image processing using fewer registers and shifts compared to devices using other SIMD architectures.

In conjunction with the described implementations, an apparatus includes first means for storing data. The first means for storing data has a lane storing first input data element. For example, the first means for storing data may include the first register 130 of FIGS. 1-3 and 5, one or more other devices, circuits, modules, or any combination thereof.

The apparatus may also include second means for storing data. The second means for storing data has a lane storing second input data elements. For example, the second means for storing data may include the second register 140 of FIGS. 1-3 and 5, one or more other devices, circuits, modules, or any combination thereof. A width of the first lane of the second means for storing data is equal to a width of the first lane of the first means for storing data. For example, the width (e.g., four) of the first lane 132 of the first register 130 may be equal to the width (e.g., four) of the first lane 142 of the second register 140.

The apparatus may also include means for a performing sliding window operation on the first input data elements in the lane of the first means for storing data and the second input data elements in the lane of the second means for storing data. For example, the means for performing the sliding window operations may include the SIMD architecture 102 of FIGS. 1 and 5, the multiplexers 202-208 of FIG. 2, the processor 301 of FIG. 3, the instructions 568 executable by the processor 510 of FIG. 5, one or more other devices, circuits, modules, or any combination thereof. The means for performing the sliding window operations has a lane width equal to the width of the lane of the first means for storing data. Performing the sliding window operation includes determining a result based on a first input data element stored in a first position of the first means for storing data and a second input data element stored in a second position of the second means for storing data. The second position is different from the first position.

Those of skill would further appreciate that the various illustrative logical blocks, configurations, modules, circuits, and algorithm steps described in connection with the implementations disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
   a first register configured to store a sequence of input data elements, the first register having a first register portion storing first input data elements of the sequence of input data elements and a second register portion storing second input data elements of the sequence of input data elements, the first input data elements adjacent to the second input data elements in the sequence of input data elements;
   a shifter circuit configured to shift the input data elements of the first register by a number of bits equal to a width of the first register portion of the first register to generate shifted data elements;
   a second register configured to store the shifted data elements, the second register having a first register portion storing first shifted data elements of the shifted data elements, the first shifted data elements corresponding to the second input data elements in the second register portion of the first register, wherein a width of the first register portion of the second register is equal to the width of the first register portion of the first register; and
   a single-instruction-multiple-data (SIMD) processing circuit having a first lane, the first lane having a lane width equal to the width of the first register portion of the first register, wherein the SIMD processing circuit is configured to perform, after shifting of the input data elements by the shifter circuit, a sliding window operation on the first input data elements in the first register portion of the first register and the first shifted data elements in the first register portion of the second register, wherein performing the sliding window operation includes determining a result based on a first input data element stored in a first position of the first register portion of the first register and a first shifted data element stored in a second position of the first register portion of the second register, the second position of the first register portion of the second register having a different position than the first position of the first register portion of the first register.

2. The apparatus of claim 1, wherein the SIMD processing circuit is configured to simultaneously perform sliding window operations on the first input data elements in the first register portion of the first register, the first shifted data elements in the first register portion of the second register, or any combination thereof, based on an instruction.

3. The apparatus of claim 2, wherein the first input data elements in the first register portion of the first register and the first shifted data elements in the first register portion of the second register are selected based on an immediate field in an operational code of the instruction.

4. The apparatus of claim 1, wherein the SIMD processing circuit comprises:
   an arithmetic and logic unit (ALU);
   a first multiplexer configured to provide one of the first input data elements in the first register portion of the first register to the ALU or one of the first shifted data elements in the first register portion of the second register to the ALU; and
   a second multiplexer configured to provide one of the first input data elements in the first register portion of the first register to the ALU or one of the first shifted data elements in the first register portion of the second register to the ALU,
   wherein the ALU is operable to perform a horizontal operation on a data element provided by the first multiplexer and a data element provided by the second multiplexer.

5. The apparatus of claim 4, wherein the horizontal operation comprises a summation operation, a bitwise OR operation, or a multiplication operation.

6. The apparatus of claim 4, wherein the ALU is operable to perform a vertical operation on the data element provided by the first multiplexer and on the data element provided by the second multiplexer, and wherein the horizontal operation is performed after the vertical operation.

7. The apparatus of claim 6, wherein the vertical operation comprises a multiplication operation.

8. The apparatus of claim 1, wherein the SIMD processing circuit further comprises a plurality of lanes including the first lane and a second lane, the second lane configured to perform a sliding window operation on the second input data elements stored in the second register portion of the first register and second shifted data elements stored in a second register portion of the second register.

9. The apparatus of claim 8, wherein the sliding window operation performed by the first lane and the sliding window operation performed by the second lane are performed in parallel.

10. The apparatus of claim 1, wherein the shifter circuit is configured to provide the shifted data elements to the second register.

11. A method comprising:
    storing a sequence of input data elements in a first register, wherein the sequence of input data elements includes first input data elements stored in a first register portion of the first register and second input data elements stored in a second register portion of the first register;
    shifting the input data elements of the first register by a number of bits equal to a width of the first register portion of the first register to generate shifted data elements;
    storing the shifted data elements in a second register, wherein the shifted data elements include first shifted data elements stored in a first register portion of a second register, wherein a width of the first register portion of the second register is equal to a width of the first register portion of the first register; and
    performing, after shifting the input data elements, a sliding window operation on the first input data elements in the first register portion of the first register and the first shifted data elements in the first register portion of the second register using a first lane of a single-instruction-multiple-data (SIMD) processing circuit, the first lane having a lane width equal to the width of the first register portion of the first register, wherein performing the sliding window operation includes determining a result based on a first input data element stored in a first position of the first register portion of the first register and a first shifted data element stored in a second position of the first register portion of the second register, the second position of the first register portion of the second register having a different position than the first position of the first register portion of the first register.

12. The method of claim 11, wherein the first input data elements include N data elements starting at a first data element and ending at an $N^{th}$ data element, wherein the first shifted data elements include N data elements starting at an $(N+1)^{th}$ data element and ending at a $2*N^{th}$ data element, and wherein N corresponds to the lane width of the SIMD processing circuit.

13. The method of claim 11, wherein the SIMD processing circuit simultaneously performs sliding window operations on the first input data elements in the first register portion of the first register, the first shifted data elements in the first register portion of the second register, or any combination thereof, based on an instruction.

14. The method of claim 13, wherein the first input data elements in the first register portion of the first register and the first input data elements in the first register portion of the second register are selected based on an immediate field in an operational code of the instruction.

15. The method of claim 11, further comprising:
providing, at a first multiplexer, one of the first input data elements in the first register portion of the first register to an arithmetic and logic unit (ALU) or one of the first shifted data elements in the first register portion of the second register to the ALU; and
providing, at a second multiplexer, one of the first input data elements in the first register portion of the first register to the ALU or one of the first shifted data elements in the first register portion of the second register to the ALU.

16. The method of claim 15, performing, at the ALU, a horizontal operation on a data element provided by the first multiplexer and a data element provided by the second multiplexer.

17. The method of claim 16, wherein the horizontal operation comprises a summation operation, a bitwise OR operation, or a multiplication operation.

18. The method of claim 16, further comprising performing a vertical operation on the data element provided by the first multiplexer and on the data element provided by the second multiplexer, and wherein the horizontal operation is performed after the vertical operation.

19. The method of claim 18, wherein the vertical operation comprises a multiplication operation.

20. The method of claim 11, further comprising performing a sliding window operation on second input data elements stored in the second register portion of the first register and second shifted data elements stored in a second register portion of the second register using a second lane of a plurality of lanes of the SIMD processing circuit, wherein the first lane is included in the plurality of lanes.

21. The method of claim 20, wherein the sliding window operation performed by the first lane and the sliding window operation performed by the second lane are performed in parallel.

22. The method of claim 11, further comprising providing the shifted data elements to the second register.

23. An apparatus comprising:
first means for storing a sequence of input data elements, the first means for storing having a first portion storing first input data elements of the sequence of input data elements and a second portion storing second input data elements of the sequence of input data elements, the first input data elements adjacent to the second input data elements in the sequence of input data elements;
means for shifting the input data elements of the first means for storing by a number of bits equal to a width of the first portion of the first means for storing to generate shifted data elements;
second means for storing the shifted data elements, the second means for storing having a first portion storing first shifted data elements of the shifted data elements, the first shifted data elements corresponding to the second input data elements of the second portion of the first means for storing, wherein a width of the first portion of the second means for storing is equal to the width of the first portion of the first means for storing; and
means for performing a sliding window operation on the first input data elements in the first portion of the first means for storing and the first shifted data elements in the first portion of the second means for storing, the means for performing the sliding window operation having a lane width equal to the width of the first portion of the first means for storing, wherein performing the sliding window operation includes determining a result based on a first input data element stored in a first position of the first portion of the first means for storing and a first shifted data element stored in a second position of the first portion of the second means for storing, the second position of the first portion of the second means for storing having a different position than the first position of the first portion of the first means for storing.

24. The apparatus of claim 23, wherein the first input data elements include N data elements starting at a first data element and ending at an $N^{th}$ data element, wherein the first shifted data elements include N data elements starting at an $(N+1)^{th}$ data element and ending at a $2*N^{th}$ data element, and wherein N corresponds to the lane width of the means for performing the sliding window operation.

25. The apparatus of claim 23, wherein the means for performing the sliding window operation simultaneously performs sliding window operations on the first input data elements in the first portion of the first means for storing, the first shifted data elements in the first portion of the second means for storing, or any combination thereof, based on an instruction.

26. The apparatus of claim 25, wherein the first input data elements in the first portion of the first means for storing and the first shifted data elements in the first portion of the second means for storing are selected based on an immediate field in an operational code of the instruction.

27. The apparatus of claim 23, further comprising;
means for providing a data element, the means for providing the data element configured to provide one of the first input data elements in the first portion of the first means for storing to an arithmetic and logic unit (ALU); and
second means for providing a data element, the second means for providing a data element configured to provide one of the first shifted data elements in the first portion of the second means for storing to the ALU.

28. The apparatus of claim 23, further comprising second means for performing a sliding window operation on the second input data elements stored in the second portion of the first means for storing and second shifted data elements stored in a second portion of the second means for storing.

29. A non-transitory computer-readable medium comprising instructions that, when executed by a processor, cause the processor to:
  store a sequence of input data elements in a first register, wherein the sequence of input data elements includes first input data elements stored in a first register portion of the first register and second input data elements stored in a second register portion of the first register;
  shift the input data elements of the first register by a number of bits equal to a width of the first register portion of the first register to generate shifted data elements;
  store the shifted data elements in a second register, wherein the shifted data elements include first shifted data elements stored in a first portion of a second register, wherein a width of the second register portion of the second register is equal to a width of the first register portion of the first register; and
  perform, after shifting the input data elements, a sliding window operation on the first input data elements in the first register portion of the first register and the first shifted data elements in the first register portion of the second register using a lane of a single-instruction-multiple-data (SIMD) processing circuit, the lane having a lane width equal to the width of the first register portion of the first register, wherein performing the sliding window operation includes determining a result based on a first input data element stored in a first position of the first register portion of the first register and a first shifted data element stored in a second position of the first register portion of the second register, the second position of the first register portion of the second register having a different position than the first position of the first register portion of the first register.

30. The non-transitory computer-readable medium of claim 29, wherein the first input data elements include N data elements starting at a first data element and ending at an $N^{th}$ data element, wherein the first shifted data elements include N data elements starting at an $(N+1)^{th}$ data element and ending at a $2*N^{th}$ data element, and wherein N corresponds to the lane width of the SIMD processing circuit.

* * * * *